United States Patent [19]
Vattuone

[11] 3,919,535

[45] Nov. 11, 1975

[54] MULTIPLE ADDEND ADDER AND MULTIPLIER

[75] Inventor: Evor S. Vattuone, San Jose, Calif.

[73] Assignee: The Singer Company, New York, N.Y.

[22] Filed: Aug. 21, 1974

[21] Appl. No.: 499,340

[52] U.S. Cl. .................................. 235/164; 235/176

[51] Int. Cl.[2] ........................ G06F 7/50; G06F 7/54

[58] Field of Search ........... 235/164, 160, 159, 156, 235/176

[56] References Cited

UNITED STATES PATENTS

| | | | |
|---|---|---|---|
| 3,691,359 | 9/1972 | Dell et al. | 235/164 |
| 3,761,698 | 9/1973 | Stephenson | 235/164 |
| 3,798,434 | 3/1974 | Melcher | 235/159 |
| 3,816,732 | 6/1974 | Jackson | 235/156 |

OTHER PUBLICATIONS

R. L. Haven, "Multiplying Circuit," Western Electric Technical Digest No. 26, Apr. 1972, pp. 37–38.

*Primary Examiner*—David H. Malzahn
*Attorney, Agent, or Firm*—Paul Hentzel; James C. Kesterson

[57] ABSTRACT

Input registers receive multiple binary addends and simultaneously forward them into a single serial adder where like binary digits are added starting with the least significant digit. For multiplication, the serial adder serially forwards the sum of the addends into a sum register having delayed outputs which separately return the addend sum to each of the input registers. Each returned sum is weighted a predetermined amount by delaying it with respect to the other sums. Because the numbers are binary, a delay of one digit place doubles the returned sum, and an advance of one digit place divides the returned sum in half. The delay outputs are weighted by powers of two, i.e., ⅛, ¼, ½, 1, 2, 4 depending on how many digit places are shifted in each return. The value of the multiplier is equal to the cumulative weights of the passed returns. A multiplier of ¾ is established by passing the ½ and ¼ returns and inhibiting the remainder. The weighted addend sums in the ½ and ¼ return are loaded into the input registers, summed by the serial adder, and shifted into an output product register.

13 Claims, 4 Drawing Figures

MULTIPLE ADDEND ADDER AND MULTIPLIER

BACKGROUND OF THE INVENTION

1. Field of the Invention

This invention relates to a multiple addend adder and multiplier circuit, and more particularly to such a circuit having a multiplier formed by powers of two in which the exponent is a whole positive or negative integer.

2. Description of the Prior Art

Heretofore, when many numbers were summed and then multiplied, separate logic circuits were provided for each operation. An adder was serially connected to a multiplier.

It is, therefore, an object of this invention to provide an integral adder-multiplier in which the addition portion and the multiplication portion have common elements.

Briefly, these and other objects are achieved by providing an input circuit for receiving the binary addends and forwarding them to an adder circuit. A displacing circuit is provided for progressively displacing the binary point of the addend sum forming a series of the multiplicand in which each member of the series has a binary point one digit place removed from the binary point of the preceding member. Each member is, in effect, multiplied or weighted by a power of two having an exponent equal to the number of digit places of displacement in that particular member. Return channels are provided for returning selected ones of the multiplicand-power of two products to the adder. The multiplier is the sum of the powers of two in the selected products. The adder sums the selected multiplicand-powers of two products forming the product of the addend sum and the multiplier.

BRIEF DESCRIPTION OF THE DRAWING

Further objects and advantages of the present integral adder multiplier and the operation thereof will become apparent from the following detailed description taken in conjunction with drawings in which.

DESCRIPTION OF THE PREFERRED EMBODIMENT

Figure 1:
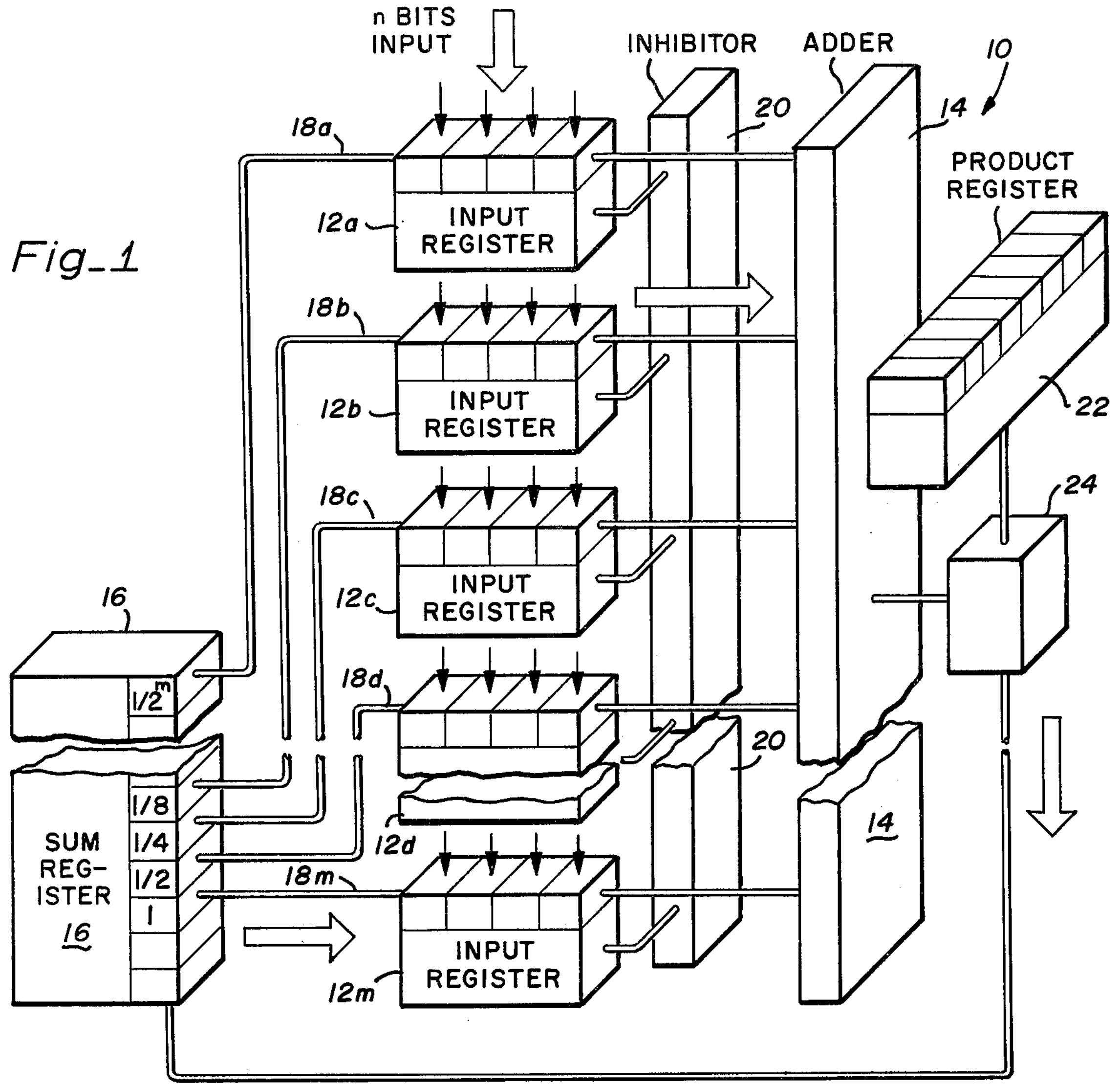
FIG. 1 is an isometric block diagram showing a general embodiment of the adder-multiplier.

FIG. 1 shows a general example of an adder/multiplier 10. During the add cycle the addends are loaded into a series of *n*-bit input registers 12*a* through 12*m* and forwarded to an adder 14. During the multiplication cycle, the sum of the addends from adder 14 is processed through a displacing circuit or sum register 16 and returned on channels 18*a* through 18*m* to input registers 12. The multiplication is accomplished by progressively delaying the addend sum return to each input register causing weighting by powers of two; and then stopping certain input registers by means of inhibitor 20, and passing selected weighted returns required to form the product. The selected weighted returns forming components of the desired product are summed in adder 14. The sum of selected returns appears in output product register 22. An add/multiply controller 24 directs the addend sum output of adder 14 into sum register 16 for multiplication, and directs weighted component sum output of adder 14 into product register 22. Input registers 12 and adder 14 are operative in both the addition and multiplication cycles. Sum register 16, return channels 18, and inhibitors 20, are operative in the multiplication cycle to define the multiplier.

The delay or place shifting in each return 18 causes powers of two weighting because a delay of one digit has the effect of dividing a clocked binary number by two. Conversely, an advance of one digit place has the effect of multiplying a clocked binary number by two. Channels 18 are weighted in a power of two sequence, i.e., ⅛, ¼, ½, 1, 2, – $2^m$. A multiplicand of, for example, 1 and 3/8 is effected by summing the 1, the ¼, and the ⅛ weighted returns and inhibiting all of the remaining channels ½, 1/16–(1/$2^m$).

Figure 2:
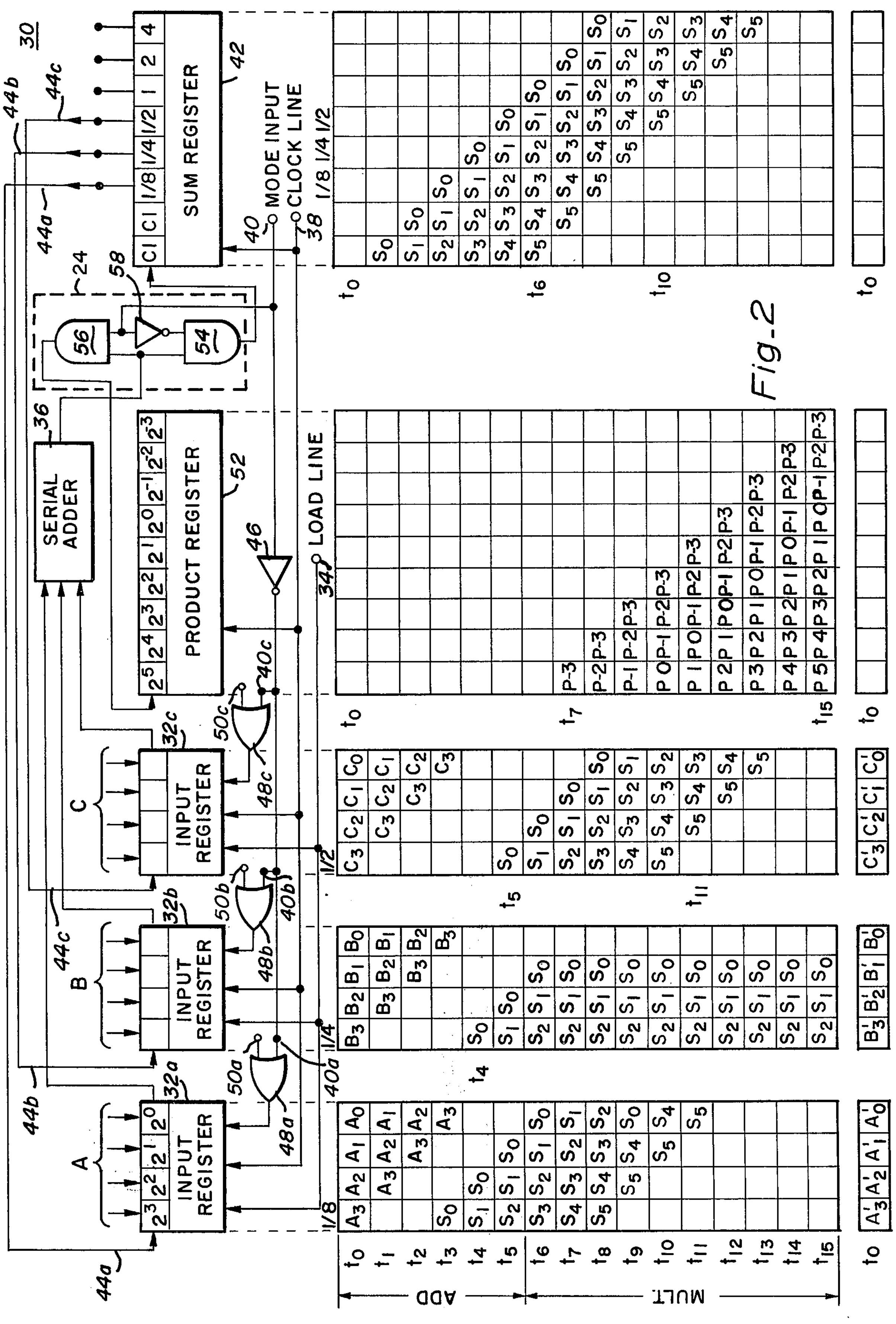
FIG. 2 is a block diagram of a three addend-⅝ multiplier embodiment with a time-content table below each register showing the shifting of the addends A, B and C, the sums S, and the products P.

FIG. 2 shows a three addend adder-⅝ multiplier circuit 30 which is a specific example of general adder/-multiplier 10 of FIG. 1. At time $t^0$ of the add cycle, the three addends A, B, and C are simultaneously loaded into parallel to serial input shift registers 32*a*, 32*b* and 32*c* by a load pulse (see FIG. 3) on a load line 34. The least most significant digit place is on the right. During times $t^1$, $t^2$, $t^3$ and $t^4$ the loaded addends are clocked serially into a carry-save-carry adder 36, the least significant digit first by the first 4 clock pulses (see FIG. 3) on clock line 38. The progress of the added sum and product data through circuit 30 is illustrated by the time-content table extending below the registers in FIG. 2. Times $t^0$–$t^{16}$ form a complete cycle having add cycle $t^0$–$t^6$ and multiply cycle $t^7$–$t^{16}$. Serial adder 36 simultaneously receives the like digit places from input registers 32 with each clock pulse starting with the least significant digits of $A^0$, $B^0$, and $C^0$ at $t^1$ which form addend sum $S^0$. The progressively calculated sums $S^0$, $S^1$, $S^2$ and $S^3$ are directed toward a six bit sum register 42 by the add/multiply mode controller 24 which is maintained in the add mode by a low mode voltage on mode input 40 (see FIG. 3). As the addend sum is clocked through sum register 42, the addend sum is returned to input registers 32 on return channels 44*a–c* one digit place at a time to a progressively increasing number of input registers. The addition cycle is complete on the sixth clock pulse ($t^6$) when the addend sum is fully loaded into sum register 42 and partially returned to input registers 32.

At $t^6$ the multiplication cycle begins and the mode voltage goes high on mode input 40. The high multiplication mode voltage is inverted by a multiplication inverter 46 and appears as a low enabling voltage on the mode inputs 40*a*, 40*b*, and 40*c* to a series of inhibiting nor gates 48*a*, 48*b* and 48*c*. Inhibiting gates 48*a*, 48*b*, and 48*c* are connected to an inhibit input (Inh) on registers 32*a*, 32*b* and 32*c* respectively. A channel control input 50 applied to inhibitor 48 determines whether the associated input register will participate in the multiplication cycle. A low or inhibit voltage at channel control input 50 combined with the low multiplier voltage at mode input 40 enables the nor gate to inhibit the clocked shifting of the last bit of the associated input register. A high of pass voltage on control input 50 disables the inhibition of inhibiting gates 48 and the associated input register can pass that component of the multiplicand on the associated weighted return. The present multiplicand of ⅝ is formed by the ½ weighted return on channel 44*a* and the ⅛ weighted return on channel 44*c*. These channels are provided with a high voltage at control input 50 to inhibit gates 44*a* and 44*c*. During the multiplication cycle $t^6$ to $t^{16}$ these channels are open and combine to form the ⅝ multiplicand. However, the ¼ weighted return on channel 44*b* is not a component of the multiplicand, and the control input 50 on inhibit gate 48*b* is low. Thus, sum $S^0$ in return channel 44*b* is prevented from shifting into the last place of input register 32*b*.

At $t^7$ the weighted sums on the first returned channel 44*a* have been clocked across input register 32*a*. The least most significant place sum $S^0$ has been clocked into serial adder 36 to provide product P-3 in the first bit of a nine-bit product register 52. Product P-3 is the $2^{-3}$ digit which is the least significant digit in the desired product. At $t^8$ P-3 shifts to the next bit and P-2 appears at the input bit to product register 52. P-2 is the $2^{-2}$ digit and is the next least significant bit. With each clock pulse the digits of the product shift allowing the next most significant digit to enter. FInally, at $t^{15}$ P-5 enters the input bit and the entire product is available in product register 52. At $t^{16}$, which is $t^0$ of the next cycle, the product in register 52 is unloaded and three new four bit addends are loaded into input registers 32.

Figure 3:
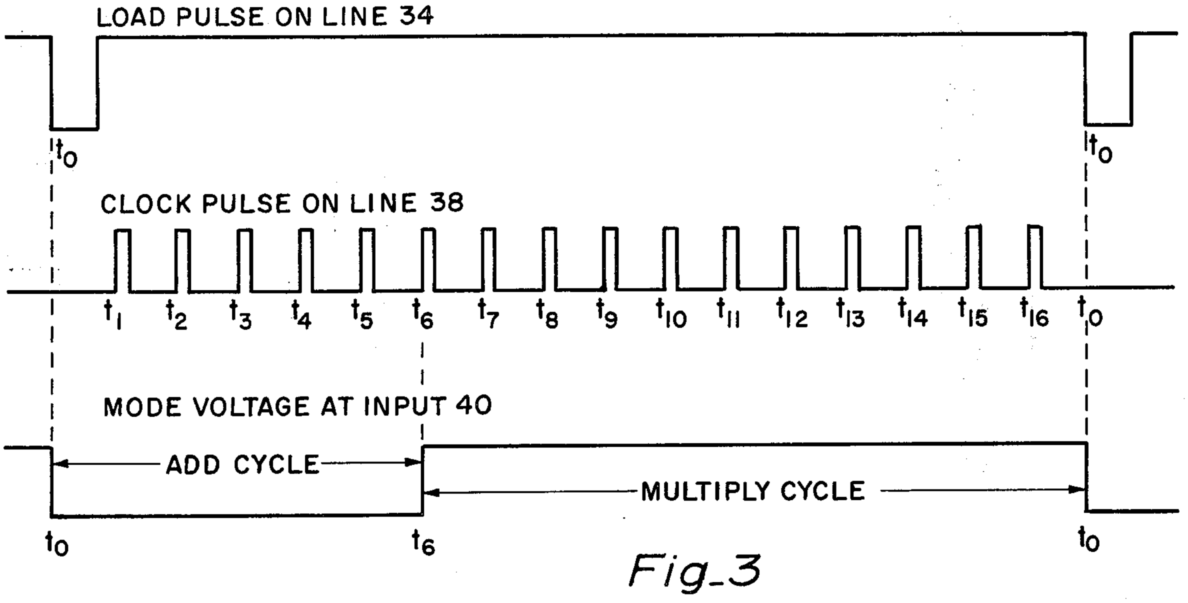
FIG. 3 is a time-pulse diagram showing the external load, clock, and mode voltages required to operate the specific embodiment of FIG. 2.

FIG. 3 shows the time relationship between the external load, clock, and mode inputs which control adder/-multiplier 30. At $t^0$ the negative load pulse appears on load line 34. During $t^1$ – $t^6$ positive clock pulses on clock line 38 shift the registers of circuit 30 through the add cycle. At $t^6$ add/multiply mode line 40 goes from low to high initiating the multiplication cycle. At $t^{16}$ or $t^0$ of the next cycle, a load pulse loads new addends into input registers 32 and unloads the product from product register 52.

The high multiplication voltage at input 40 initiates the multiplication cycle at $t^6$ by enabling the mode input to inhibitors 48 and by switching mode controller 24 into the multiply mode. Controller 24 directs the output of adder 36 through a two lead sum gate 54 into sum register 42 during the add cycle $t^0$ – $t^5$; and through a two lead multiply gate 56 into the product register 52 during the multiplication cycle $t^6$ – $t^{15}$. The other lead of sum gate 54 receives the mode voltage from mode input 40 as inverted through inverter 58. During the add cycle the low mode voltage is inverted by inverter 58 and appears high into sum gate 54 permitting the addend sum output of adder 36 to enable sum gate 54 for entering the addend sums into sum register 52. Meanwhile, the low add mode voltage disenables multiplication gate 56 which is connected directly to mode 40 by its other lead. During the multiplication cycle, the high multiplication voltage enables multiplication gate 56 permitting the product output of adder 36 to enter product register 52. The high multiplication mode voltage is inverted by inverter 58 to disenable sum gate 54 during the multiplication cycle.

Figure 4:
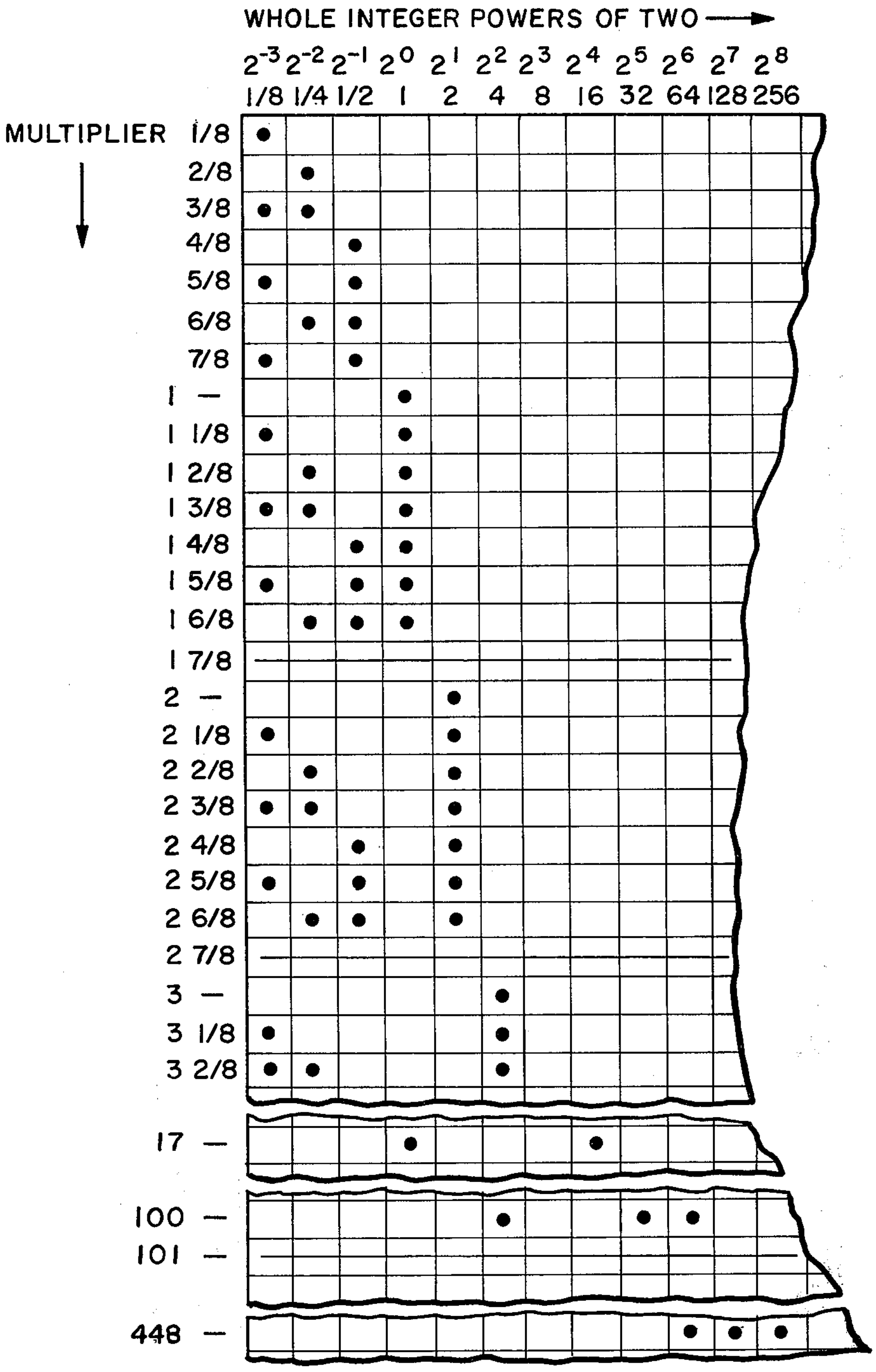
FIG. 4 is a partial table of multipliers having three or less power-of-two components.

The multiplier of the FIG. 2 three addend circuit 30 is limited to binary numbers that can be formed by summing any three whole integer powers of two. In FIG. 2, the sequential powers of two, $2^{-3}$, $2^{-2}$ and $2^{-1}$, are employed to yield multiplier components ⅛, ¼ and ½. The ⅝ multiplication is effected by summing the ⅛ and ½ channels. The ¼ channel is inhibited through gates 48*b*. Other multipliers may be formed by reconnecting return channels 44 to other stages in sum register 42. FIG. 4 shows some of the multipliers which may be formed by three or less powers of two components, wherein the powers are limited to positive and negative whole numbers. The powers are limited to whole numbers because the multiplication is effected merely by shifting the binary point of the binary addend sum which is equivalent to multiplying by a power of two. A 1 digit shift halves or doubles the addend sum. A two digit shift quarters or quadruples the addend sum, etc. As shown in FIG. 4 multipliers may readily be formed in ⅛ steps from ⅛ to 1 and 6/8 by summing three or less powers of two components. However, the multiplier 1 ⅞ (and others) requires four, components, ⅛, ¼, ½ and 1, and may not be formed by the three addend-three return channel circuit 30 of FIG. 2. Larger multipliers may be formed by summing three or less large powers of two components. The total number of useable components may be increased by employing more return channels and input registers. Happily, such a provision also increases the number of addends ($m$) the circuit is capable of processing simultaneously. Further, increasing the number of components of the multiplier decreases the increment between adjacent useable multipliers.

Sum register 42 must have a sufficient number of places or stages to accommodate the $n$-bit addends plus the additional carry digit places of the addend sum generated by adding the three addends. Adder 36 must be cleared of all carry digits in the addend sum prior to entry therein of the multiplicand-component products form return channels 44. Three places are provided in FIG. 2 for clearing adder 36 prior to the first return channel 44*a*. The number of places (S) in sum register 42 is expressed generally by:

$$S = n + \text{interger}\ (\log_2{}^m) + \log_2{}^m$$

For the FIG. 2 example, where $n = 4$ and $m = 3$, $S = 6$. Further, register 42 must have sufficient places to contain the larger power-of-two components required for forming large multipliers. In FIG. 2 reserve powers of two places 1, 2 and 4 are provided permitting a maximum three component multiplier of seven.

Product register 52 must have sufficient places or stages to accommodate the S digits of the addend sum plus the additional carry digits generated by the multiplication. The number of places (P) in product register 52 may be expressed generally by:

$$P = m + S = M + n + \text{interger}\ (\log_2{}^m)$$

For the FIG. 2 example where $n = 4$ and $m = 3$, $P = 9$. Increasing the number of input bits, or the number of addends, or the number of places between the largest and smalledst power of two components in the multiplier, increases P and S.

I claim as my invention:

1. A binary, multiple addend, adder-multiplier circuit having a multiplier formed by powers-of-two components having whole integer exponents, comprising:

input means for receiving a plurality of binary addends;

adder circuit for adding the plurality of addends forming a binary addend sum multiplicand;

displacing circuit for forming a series of the multiplicand, each multiplicand member of the series having the binary point displaced a predetermined amount with respect to the other multiplicand members to effect a multiplication of each multiplicand member by a power of two forming a series of multiplicand power-of-two products; and means for selecting among the multiplicand power-of-two products those which are components of the multiplier to form a series of multiplicand power-of-two components which are added together by the adder circuit to provide the product of the addend sum multiplicand times the multiplier; and output means for receiving the sum of the multiplicand power-of-two components.

2. The circuit of claim 1, further comprising a controller means for directing the addend sum multiplicand output of the adder into the displacing circuit, and for directing the sum of the multiplicand power-of-two components into the output means.

3. The binary circuit of claim 1, wherein the point of the addend sum multiplicand is sequentially displaced to form the series of the multiplicand.

4. The circuit of claim 3, wherein the means for selecting the series multiplicand power-of-two components comprises a separate channel for advancing each multiplicand power-of-two component to the adder for summing.

5. The circuit of claim 3, wherein the means for selecting the series of multiplicand power-of-two components comprises:

a separate channel for directing each multiplicand power-of-two product to the adder; and inhibitor circuits for preventing the nonselected multiplicand power-of-two products from entering the adder.

6. The circuit of claim 5, wherein the input means is a plurality of input shift registers having serial outputs to the adder circuit, one input shift register for shifting each one of the plurality of addends into the adder circuit least significant digit place first.

7. The circuit of claim 5, wherein the inhibitor circuit is at least one logic gate, one input of which is adapted to receive an external mode pulse and another input of which is adapted to receive an external inhibit pulse.

8. The circuit of claim 1, wherein the binary point is displaced by processing of each multiplicand member through the displacing circuit in time sequence.

9. The circuit of claim 1, wherein the displacing circuit is adapted to receive external clocking pulses to shift the addend sum multiplicand there through, and the displacement in time between the multiplicand members is accomplished by initiating the multiplicand members on separate sequential clock pulses thus causing each multiplicand member to be one clock pulse or one binary place digit behind the preceding multiplicand member.

10. The circuit of claim 9, wherein the plurality of addends enter the adder circuit least significant digit first, and the addend sum multiplicand enters the displacing circuit least significant digit first causing each multiplicand member to be double the value of the preceding multiplicand member.

11. A binary, multiple addend, adder-multiplier circuit having an addition cycle during which the multiple addends are summed and a multiplication cycle during which the addend sum is multiplied by a multiplier formed by the sum of a series of powers of two weightings having whole interger positive or negative exponents, the circuit comprising:

a plurality of input registers into which the multiple addends are loaded during the addition cycle;

an adder circuit for summing the multiple addends forming an addend sum;

serial sum register for shifting the addend sum there through from stage to stage one digit place at a time, each stage receiving the first digit place of the addend sum one clock pulse later than the preceding stage defining a power-of-two weighting for each stage having an exponent which is one whole interger displaced from the exponent of the power of two weighting of the preceding or subsequent stage;

channel means for loading at least some of the weighted addend sums into at least some of the input registers during the multiplication mode for summing in the adder circuit to form the product of the addend sum times the sum of the power-of-two weighting; and output means for receiving the product from the adder circuit.

12. The circuit of claim 11, wherein the channel means comprises inhibitor circuits for permitting advancement of the addend sums weighted by one of the powers-of-two which is a component of the multiplier, and preventing advancement of the addend sums weighted by a power-of-two which is not one of the power-of-two series components of the multiplier.

13. The circuit of claim 12, further comprising a controller for directing the addend sum output of the adder circuit into the sum register during the addition cycle, and for directing the weighted addend sum output of the adder circuit into the output means during the multiplication cycle.

* * * * *